3,006,926
PRODUCTION OF CYCLIC ETHERS

Leslie C. Case, Lafayette, Ind., and Laurence F. Schmoyer, Wilmington, Del., assignors to Research Corporation, New York, N.Y., a corporation of New York
No Drawing. Filed Aug. 25, 1959, Ser. No. 835,835
4 Claims. (Cl. 260—333)

This invention relates to a novel method of preparing cyclic ethers.

We have found that cyclic ethers containing from two to five carbon atoms in the ether ring may be readily and economically produced by adding a mixture of the corresponding diol and sulfuric acid to a hot aqueous solution of a caustic alkali and distilling off the cyclic ether thereby produced.

While the proportion of sulfuric acid to diol is not critical, it is preferred to use not greater than an equimolar quantity of concentrated sulfuric acid. The concentration of acid also is not critical, the use of 96–98% being convenient and satisfactory. A sulfuric acid concentration of at least 90% is preferred.

The yield of cyclic ether is in general higher when the concentration of the aqueous caustic alkali (sodium or potassium hydroxide) solution is maintained at least about 40%.

While the method is useful in the preparation of cyclic ethers containing from two to five carbon atoms in the ether ring, it is particularly useful for the production of oxetanes, such as 2-methyl-, 3,3-dimethyl-, 3,3-diethyl-, 3-ethyl-3-n-butyl-, 2-n-propyl-3-ethyl-oxetanes made from butane-1,3-diol, 2,2-dimethylpropane-1,3-diol, 2,2-diethylpropane-1,3-diol, 2-ethyl-2-butylpropane-1,3-diol and 2-ethyl-3-propylpropane-1,3-diol, respectively.

Other typical cyclic ethers which can be made by the method of the invention are tetrahydrofuran, 2,2,5,5-tetramethyltetrahydrofuran and tetrahydropyran, made from butane-1,4-diol, 2,5-dimethylhexane-2,5-diol and pentane-1,5-diol, respectively.

Other typical cyclic ethers which can be made by the method of the invention are tetrahydrofuran, 2,2,5,5-tetramethyltetrahydrofuran and tetrahydropyran, made from butane-1,4-diol, 2,5-dimethylhexane-2,5-diol and pentane-1,5-diol, respectively.

The following examples are illustrative of the principles of the invention:

3,3-dimethyloxetane 111 ml. of 96% sulfuric acid are added to 208 gm. of neopentylglycol (2,2-dimethylpropane-1,3-diol) and the mixture is stirred giving a very viscous solution. A solution of 240 gm. of sodium hydroxide in 200 ml. of water is brought to the boiling point in a 1 liter flask equipped with a stirrer, dropping funnel and distilling head. The glycol solution is added from the dropping funnel at such a rate as to maintain boiling. The glycol solution may be warmed to reduce the viscosity and maintain an adequate rate of flow.

The distillate, about 120 ml., separates into two layers. The lower aqueous layer is separated and partially redistilled to recover the organic material and the material thus recovered is combined with the original organic layer, dried with calcium chloride and distilled, giving about 50 gm. of 3,3-dimethyloxetane boiling between 79° and 83° C., which can be further purified by redistillation from calcium hydride to a boiling point of 79.2° to 80.3° C. at 756 mm. of mercury.

2-methyloxetane

In the manner described in the foregoing example, 90 gm. of 1,3-butyleneglycol dissolved in 55.5 ml. of sulfuric acid are added to a boiling solution of 240 gm. of sodium hydroxide in 250 ml. of water.

About 15 to 20 gm. of 2-methyloxetane is obtained by salting out the distillate with calcium chloride.

We claim:

1. A method of making cyclic ethers which comprises feeding a mixture of an alkanediol in which the hydroxyl groups are separated by a chain of from 2 to 5 carbon atoms and concentrated sulfuric acid into a hot aqueous solution of a caustic alkali and distilling off the cyclic ether thereby produced.

2. A method of making oxetanes which comprises feeding a mixture of an alkane-1,3-diol and concentrated sulfuric acid into a hot aqueous solution of a caustic alkali and distilling off the cyclic ether thereby produced.

3. The method of making 3,3-dimethyloxetane which comprises feeding a mixture of 2,2-dimethylpropane-1,3-diol and concentrated sulfuric acid into a hot aqueous solution of a caustic alkali and distilling off the 3,3-dimethyloxetane thereby produced.

4. The method of making 2-methyloxetane which comprises feeding a mixture of 1,3 butyleneglycol and concentrated sulfuric acid into a hot aqueous solution of a caustic alkali and distilling off the 2-methyloxetane thereby produced.

No references cited.